J. N. DUNCAN.
TROLLEY WHEEL AND HARP.
APPLICATION FILED APR. 9, 1918.

1,330,177.

Patented Feb. 10, 1920.

INVENTOR:
J. N. DUNCAN
By Earl M. Sinclair
Att'y.

UNITED STATES PATENT OFFICE.

JOHN N. DUNCAN, OF BOONE, IOWA.

TROLLEY WHEEL AND HARP.

1,330,177.  Specification of Letters Patent.  Patented Feb. 10, 1920.

Application filed April 9, 1918. Serial No. 227,432.

*To all whom it may concern:*

Be it known that I, JOHN N. DUNCAN, a citizen of the United States of America, and resident of Boone, Boone county, Iowa, have invented a new and useful Trolley Wheel and Harp, of which the following is a specification.

The object of this invention is to provide an improved construction for a wheel and its bearing, the radially outer portion only of the wheel being designed for rotation and being removable and replaceable, thus reducing the cost of replacing worn parts.

A further object of this invention is to provide an improved construction for a trolley head including a wheel with a central non-rotating member of relatively large diameter, a grooved, annular member mounted for rotation on said non-rotating member, anti-friction devices between the rotating and non-rotating members, and means for supporting said non-rotating member by a simple, rigid construction.

A further object of this invention is to provide an improved construction for a trolley head including a wheel with a relatively large, central non-rotating axle plate, an annular member mounted for rotation thereon and carrying a grooved rim adapted to engage a trolley wire, anti-friction devices between said annular member and the non-rotating member, and contact devices on said non-rotating member engaging said rotating member, whereby current may be taken from said wire and transmitted to said non-rotating member without passing through the anti-friction devices.

A further object of this invention is to provide an improved construction for a trolley head designed to minimize lateral oscillation and prevent drumming sounds on the roof of the car on which the device is mounted.

A further object of this invention is to reduce the cost of trolley devices by providing means for removing and replacing worn rim members.

My invention consists in the construction, arrangement and combination of elements hereinafter set forth, pointed out in my claims and illustrated by the accompanying drawing, in which—

Figure 1:
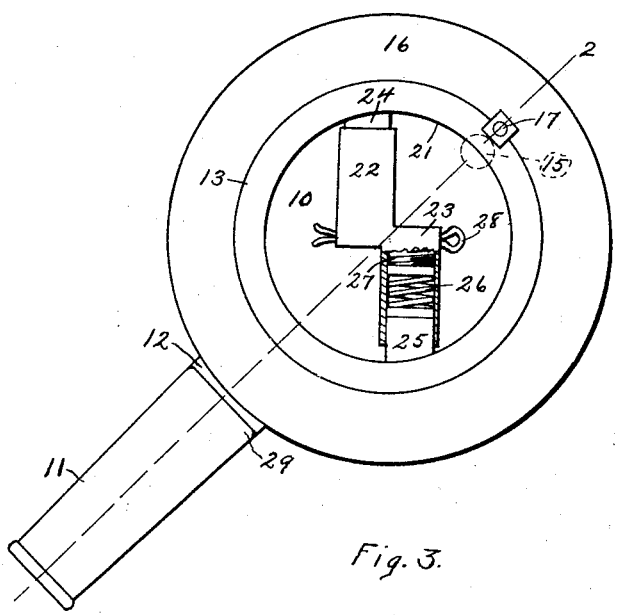
Figure 2:
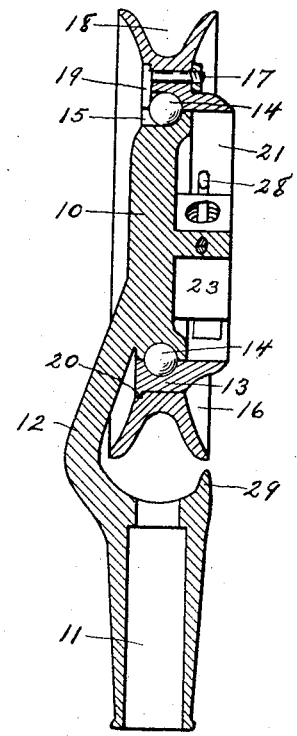
Figure 3:
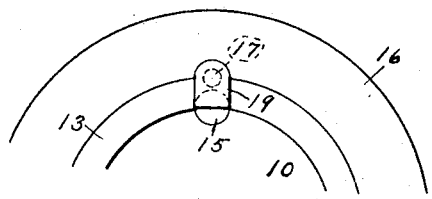

Figure 1 is a side elevation illustrating the embodiment of my invention in a trolley head. Fig. 2 is a longitudinal section on the line 2—2 of Fig. 1. Fig. 3 is a fragmentary side elevation opposite to the showing of Fig. 1.

In the construction of the device as shown the numeral 10 designates an axle plate of circular form and provided with a portion of a ball race in its periphery. A socket 11 is adapted to receive and be secured to the upper end portion of a trolley pole (not shown) in any suitable manner, and said socket is connected by an arm 12 to the axle plate 10. The axle plate, socket and connecting arm (which constitutes a one-piece harp) preferably are formed integrally by casting. The arm 12 is offset intermediate of its ends laterally out of the plane of the axle plate and has its upper end portion merging into one side of said plate, so that the periphery of the axle plate is continuous and uninterrupted and is spaced from the upper end of the socket 11. An annular wheel member 13 is adapted to embrace circumferentially and to rotate on the axle plate 10, and said wheel member is formed on its inner perimeter with the complementary portion of the ball race part of which is formed in the periphery of said axle plate, and anti-friction devices, such as bearing balls 14 are mounted in said ball race. The balls 14 not only provide an anti-friction bearing for the rotation of the annular wheel member 13 on the axle plate but also serve to prevent accidental removal of said wheel member from the axle plate. A circular hole 15 has one half formed in the marginal portion of the axle plate 10 and the other half formed in the annular wheel member 13, and provides means for inserting balls 14 into the ball race when the wheel member is in such position on the axle plate as to bring the mating members of said hole into alinement. An annular rim member 16 is provided and is fitted to and adapted to be mounted on the wheel member 13 and be secured thereto as by a transversely arranged bolt 17. The rim member 16 is laterally expanded at its outer periphery and is formed with a peripheral groove 18 adapted to engage a trolley wire (not shown) in a common manner. The hole for the connecting bolt 17 preferably is on the same radial line as the portion of the hole 15 formed in the annular wheel member 13, and said bolt is formed with an elongated head 19 adapted to cover such portion of the hole 15 and prevent accidental displacement of balls 14 from the race.

The annular wheel member 13 preferably is formed with a peripheral flange 20 (Fig. 2) adjacent one face thereof and the rim member 16 is formed with a corresponding rabbet, thereby providing interengaging shoulders on said members forming a stop to limit lateral movement of the rim member upon the wheel member in one direction.

An annular flange 21 is formed on the annular wheel member 13 and projects laterally therefrom beyond that face of the axle plate 10 opposite to the connecting arm or harp 12. Bearings 22, 23 are formed on the adjacent face of the axle plate 10, and contact brushes 24, 25 are slidably mounted in said bearings, project at their outer ends therefrom, and slidably engage the inner surface of the flange 21. Coil springs 26 (one of which is shown in Fig. 1) are mounted in the bearings 22, 23 and yieldingly hold the contact brushes 24, 25 against the flange 21. Inner end portions of the bearings 22, 23 are interiorly threaded, and adjusting nuts 27 are screwed therein and are employed to adjust the tension of the springs 26. As shown the inner end portions of the bearings 22, 23 overlap each other, and a key or pin 28 is mounted transversely through the overlapping portions and serves to prevent accidental removal of the devices from said bearings.

In use the parts are assembled as shown and the annular wheel member and grooved rim rotate on the fixed axle plate and the interposed bearing balls render such rotation comparatively frictionless and quiet. The axle plate 10 is of relatively large diameter, preferably more than half of the diameter of the complete wheel between its tread portions, thus presenting a relatively large anti-friction surface for the rotation of the rim and wheel members, and lateral oscillation of the rotating members and wabbling is prevented, thus further tending to reduce wear and noise. When the grooved contacting portion of the wheel has become sufficiently worn by use to make desirable its renewal, such portion may be replaced by removal and replacement of the rim member 16, at relatively small cost and waste of material. Thus the life of the device may be multiplied many times and labor and material conserved.

Provision of the anti-friction devices and elimination of lateral oscillation or wabbling of the rotating portions of the device greatly reduces the attendant "drumming" sounds usually manifested on the roofs of cars equipped with trolley devices.

A lip 29 preferably is formed on the socket member 11 opposite to the supporting arm or harp 12 and projects toward and ends adjacent to and substantially in the plane of one face of the grooved rim member 16, so that there are no projections to catch upon the trolley wire in case the wheel becomes displaced therefrom.

The contact brushes 24, 25 serve to take current from the live trolley wire through the grooved rim 16 wheel member 13 and flange 16 thereof and transmit it to the axle plate 10 and members connected therewith, so that the current does not pass through the anti-friction devices.

It is to be understood that various modifications may be employed to adapt this invention to other uses than those illustrated and described, and I do not desire to be understood as limiting myself to the precise construction set forth, save as limited by the scope of the appended claims.

I claim as my invention—

1. A trolley head, comprising a support, a circular axle plate carried thereby, a wheel member of annular form mounted for rotation on said axle plate, anti-friction devices being interposed between said axle plate and wheel member, said wheel member being formed with a laterally projecting annular flange, and contact brushes carried by said axle plate and adapted for sliding contact with the inner face of said annular flange.

2. A trolley head, comprising an axle plate of relatively large diameter, a socket member adapted to be carried by a trolley pole and supporting said axle plate, a wheel member of annular form mounted for rotation on said axle plate, anti-friction devices being interposed between said axle plate and wheel member, said wheel member being formed with a laterally projecting annular flange, and spring-pressed contact brushes carried by said axle plate on the side opposite to said one-arm harp and adapted for sliding contact with the inner face of said annular flange.

3. A trolley head, comprising a support, a relatively stationary axle member carried thereby, an annular wheel member mounted for rotation on said axle member, anti-friction devices being interposed between said axle and wheel members, said wheel member being formed with a laterally projecting annular flange, slide bearings being formed on one side of said axle member, contact devices mounted in and projecting from said slide bearings, and yielding pressure devices in said bearings engaging said contact devices and serving to hold them in contact with said annular flange.

4. A trolley head, comprising an axle plate of relatively large diameter, a socket member adapted to be secured to a trolley pole, a supporting arm carried by said socket member and offset laterally and merging into one face of said axle plate whereby the axle plate is rigidly supported in spaced relation to the socket member, and an annular grooved wheel device mounted for rotation on said axle plate.

5. A trolley head, comprising an axle plate, a socket member adapted to be secured to a trolley pole, a supporting arm extending from one side portion of said socket member and offset laterally and merging into one face of said axle plate whereby the axle plate is rigidly supported in spaced relation to the socket member, and an annular member mounted for rotation on said axle plate and adapted to engage a trolley wire, said annular member being adapted for rotation between the axle plate and adjacent end of the socket member, a lip being formed on the socket member opposite to the supporting arm and projecting toward and ending adjacent the rim and substantially in the plane of one face of the rotary member.

6. A trolley head, comprising a circular axle plate, a socket member adapted to be carried by a trolley pole, a harp arm carried by said socket member and merging into one face of said axle plate, an annular wheel member mounted for rotation on said axle plate, anti-friction devices being interposed between said axle plate and wheel member, said wheel member being formed with a laterally projecting annular flange, slide bearings being formed on one face of said axle plate, contact brushes mounted in and projecting from said slide bearings, and yielding pressure devices in said bearings engaging said contact brushes and serving to hold them in contact with said annular flange.

Signed at Boone, in the county of Boone and State of Iowa, this 23 day of March, 1918.

JOHN N. DUNCAN.